Figure 1:
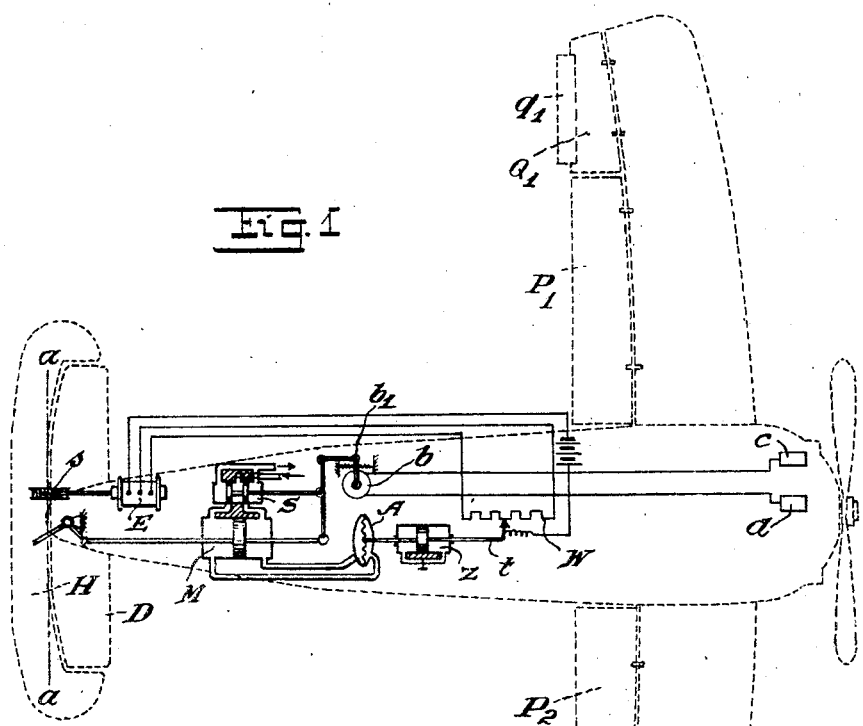

June 4, 1935.   E. FISCHEL   2,003,930

AUTOMATIC RUDDER CONTROL DEVICE

Filed May 3, 1934

Inventor.
Eduard Fischel
by Lorka & Kellenbeck
Attorneys.

Patented June 4, 1935

2,003,930

UNITED STATES PATENT OFFICE 2,003,930

AUTOMATIC RUDDER CONTROL DEVICE

Eduard Fischel, Berlin-Charlottenburg, Germany, assignor to Siemens-Apparate und Maschinen G. m. b. H., Berlin, Germany, a corporation of Germany Application May 3, 1934, Serial No. 723,659
In Germany May 11, 1933

10 Claims. (Cl. 244—29)

This invention relates to improvements in automatic controlling devices for the control surfaces of aircraft and watercraft.

Both in ships as well as in aircrafts, and particularly in relatively large aircraft, there are frequently provided in addition to the control surfaces serving for the manœuvring of ships or aircraft, auxiliary control surfaces constructed somewhat in the manner of the Flettner control surface, or so-called adjustable stabilizing surfaces situated adjacent to, or in front, of the main control surfaces, by which relatively permanent out-of-trim conditions or other disturbances of the position of equilibrium or of the direction of movement of the vessel can be compensated. Such out-of-trim conditions arise in single motor aeroplanes mainly about the transverse axis of the craft and to counterbalance them, it is known to provide the stabilizing surface, usually termed the tail plane, located in front of the elevator with a device which enables the said surface to be adjusted by hand from the pilot's seat. In the case of multiple motor aeroplanes, the supplementary adjustment of auxiliary control surfaces is used both in respect of the elevator and rudder controls in order to be able to effect the necessary compensation about all axes, of the unbalanced turning moment which arises on the failure of one or more of the motors. If the existing stabilizing surfaces such as the tail plane and tail fin are not to be adjusted, the various control surfaces, such as the elevator and rudder can be provided, for example, with movable flaps on their edges, these flaps being adjustable by rods or cables from the pilot's seat. The adjustment of the flaps alters the effective profile of the control surfaces and thereby produces a tendency of the control surface to adjust itself to a new position.

Particularly in the case of large aircraft, both the one as well as the other of the aforesaid methods of applying additional control surfaces may be used conjointly. With hand control, the aircraft pilot actuates these supplementary controlling surfaces even when he alters the condition of flight of his machine. Thus, he will always make use of the supplementary elevator control when, after starting, the machine is to pass into a new condition of flight and again when the machine commences a gliding flight or commences to make a landing.

In known automatic aircraft controls, either no devices at all have been provided for compensating the above mentioned out-of-trim condition, or there has been inserted in the automatic control device of the main control surface, for example, in the re-setting gear located between the servo-motor for the control surface and its regulating device, a flexible arrangement consisting, for example, of an hydraulic damping cylinder and a spring, which arrangement, with long continuing deflections of the control surface, effected a shortening or lengthening of the control rod. This arrangement fully carries out its purpose in the case of single motor machines without stabilizing surfaces, but in the case of those aircraft which are provided with trimming devices, it is in certain circumstances accompanied by moments of considerable danger. Since with this automatic aircraft control, all out-of-trim conditions and other disturbances of long continuance, of the position of equilibrium of the aircraft are compensated by means of the main control surfaces, the aircraft will at the moment of failure of the automatic control be in full out-of-trim condition. It is then extremely difficult for the pilot to obtain control of the out-of-trim machine with the necessary rapidity.

The invention has for its object to improve the known forms of control above referred to, by arranging that the main control surface shall serve simply for manœuvring purposes or for compensating oscillations of the aircraft of short duration about the position of equilibrium to be stabilized, while out-of-trim conditions and other disturbances acting for a relatively long duration are compensated by a separate automatic adjustment of supplementary surfaces which can be either the normal stabilizing surfaces such as the tail plane or tail fin, or auxiliary control surfaces. The adjustment of these supplementary out-of-trim control surfaces is effected in accordance with the invention by a separate motor, which is disposed adjacent to the servo-motor which is arranged to adjust the main control surfaces and which is controlled by the adjusting device of the said main surfaces. As the automatic adjustment of the supplementary surfaces is, above all, required to cause the main control surfaces to remain in normal flight in the zero or neutral position, that is to say, in a position in which they are not subject to any turning moment, the control mechanism of the motor adjusting the supplementary surfaces is preferably effected in dependence upon the adjusting movements or adjusting forces arising in the main control device and is consequently relieved by the supplementary control device of the servo-motor of the main control surface so that the size and weight of the mechanism can be considerably reduced.

The invention is more fully described below with reference to the accompanying diagrammatic drawing, in which:—

Figure 2A:
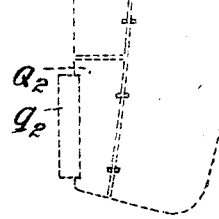
Figure 2:
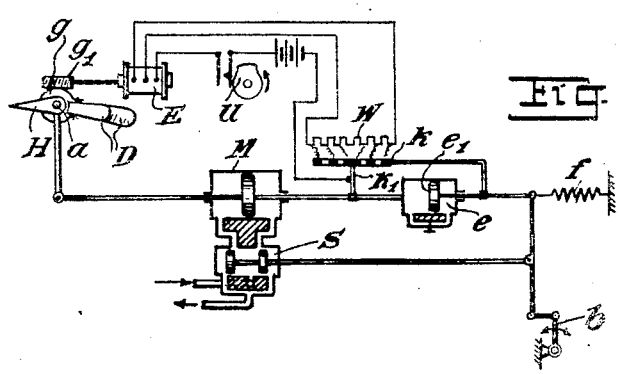

Figure 1 shows an aeroplane in plan view provided with one form of device constructed in accordance with the invention for the altitude control of the machine;

Figure 2ª shows a form of rudder control in side elevation; and

Figure 2 shows the mechanism for actuating the rudder control of Figure 2ª.

From Figure 1 the principle of the usual arrangement of the main and auxiliary control and stabilizing surfaces for the altitude and lateral control of aircraft can be appreciated. For example, on the trailing edge of the wings the main ailerons $Q_1$ and $Q_2$ for effecting the lateral or banking control are hinged and also adjustable stabilizing surfaces $P_1$ and $P_2$; the relative position of the two sets of surfaces $Q_1$, $Q_2$ and $P_1$, $P_2$ can be reversed. Instead of the surfaces $P_1$, $P_2$ auxiliary ailerons $q_1$ and $q_2$ can be used which, like the main ailerons, are always moved in the contrary sense to one another by a suitable control gear.

A further possibility of compensating for out-of-trim conditions consists in adjusting the main ailerons $Q_1$ and $Q_2$ together with their connecting rods, without necessitating supplementary ailerons, by shortening or lengthening the coupling rod so that the two ailerons are relatively displaced and normally form an angle with respect to each other and compensate by the turning moment thereby produced for the out-of-trim condition. The manner in which the invention is applied to such aileron controls is hereinafter described.

For altitude control there is provided the main elevator H and the usual stabilizing surface comprising a tail plane D, which are both adjustable about a transverse axis $a$—$a$ of the aircraft. The adjustment of the elevator H is effected by a servo-motor, for instance an hydraulic motor M comprising a cylinder and piston therein and which is operatively controlled by a slide valve S. The piston rod of the motor M is coupled on the one hand to the elevator H and on the other hand to the control valve S, so that the valve is automatically returned by the motor M to normal position after movement.

The valve S is adjusted by the crank arm $b_1$ of the rotary armature of an electro-magnetic device $b$, which is operatively connected to control apparatus or instruments $c$ and $d$ arranged, for example, at the pilot's seat, the said armature being arranged to transmit the deflections of the said apparatus to the control slide valve S. The apparatus $d$ determines, for example, the divergences of the speed of flight at any particular moment from the normal predetermined speed, and the apparatus $c$ determines the angular speed of the rotation of the aircraft about its transverse axis.

This automatic control, which is known in itself, ensures by the movements of the elevator effected thereby, a stabilization of speed of the aircraft. Thus, if the speed increases, the elevator is moved to increase the climbing angle of the aircraft and thereby automatically reduce the speed, and vice versa. If the stabilizing surface formed by the tail plane D which is situated in front of the elevator H, were not adjustable, all out-of-trim conditions taking place about the transverse axis of the aircraft and which may be caused, for example, by movement of weight within the aircraft, or by alterations in the thrust-drag couple due to variations of the pulling power of the propeller motor, or by variations of the angle of incidence or other causes, would have to equalized by the elevator H. In order to avoid this, out-of-trim conditions are compensated by adjustment of the stabilizing surface, namely, the tail plane D. In accordance with the invention, the equalizing adjustments of the stabilizing surface are effected automatically by a second servo-motor, for instance an electric motor E actuating the stabilizing surface D by means of a worm drive $s$. The control of the motor E is dependent on the motor M and is derived from the difference of pressure in the two cylinder spaces of the said motor E which pressure difference influences the diaphragm of a differential pressure gauge A, the spaces on the opposite sides of the diaphragm being connected to the said cylinder spaces. A rod $t$ is connected to the diaphragm and to the control contact of a potential divider W which controls the motor E. Every displacement of the piston of the motor M from its central position as shown in the drawing, causes a corresponding deflection of the control surface H, which then, on its part, exerts a corresponding reactive pull or pressure on the motor piston so that the pressures of the liquid differ from each other in the two cylinder spaces of the said motor. In order to prevent the potential divider W from being displaced by the differential pressure gauge A in response to the smaller and relatively rapidly succeeding deflections of the control surface H, the movement of the rod $t$ is damped by a stationary hydraulic piston and cylinder dashpot device $z$, the piston of which is carried by the rod $t$. Consequently, only deflections of relatively long duration on one side or the other of the diaphragm of the differential pressure gauge A, are transmitted to the control contact of the potential divider W, so that the motor E is only switched in when the elevator H develops a relatively permanent deflection or pressure towards one or the other side of its neutral position. The adjustment of the stabilizing surface D continues in the appropriate direction and for such a period until the out-of-trim condition of the aircraft about its transverse axis is equalized and the elevator H has again returned into its central or neutral position in which it is not subjected to pressure which produces a turning moment.

Should the control of the motor E as described be too sensitive, that is to say, be inclined to effect an excessive controlling action, a time switch can be inserted in the circuit of the motor E which only switches the motor in for short periods at definite time intervals. Instead of an electric motor, an hydraulic or pneumatic motor could, of course, also be used for the adjustment of the stabilizing surface D. Finally, this motor could also be arranged to actuate an auxiliary flap or control surface carried on the main controlling surface H, instead of the surface D as shown.

In the embodiment of the invention for lateral steering shown diagrammatically in Figures 2 and 2ª the main control surface forming the rudder H is rotatably mounted about the same (upright) axis $a$ as a stabilizing surface D forming the tail fin and in this instance also, similarly to the arrangement according to Figure 1 is adjusted by an hydraulic motor M, the controlling slide valve S of which is adjusted by the crank arm b, in this case, for example, in accordance with the deflections of a compass from the desired direction of flight. The rod operatively connected between the motor M and the control slide valve S for returning the latter after actuation of rudder H by the motor, is formed in two parts between which a flexible device or member is connected which consists of an hydraulic cylinder $e$ provided with a piston $e_1$ and a control spring $f$, which is anchored at one end to a fixed point and at the other end to the part of the rod which carries the piston; the other part of the rod is connected between the hydraulic cylinder and the piston of the motor M. As long as the rudder H is in its central or neutral position, the piston $e_1$ will remain in its central position in the cylinder $e$. Only when the rudder H is deflected for a relatively prolonged period towards one side or the other, will a relative displacement between the piston $e_1$ and its cylinder $e$ be effected under the action of the spring $f$, since with a deflection of the rudder H the piston of the motor M and the cylinder $e$ therewith, must be displaced with respect to the fixed point of the spring $f$. This prolonged deflection of the rudder H, is, in accordance with the invention, required to be automatically equalized by a corresponding adjustment of the stabilizing surface D; that is to say, the persisting out-of-trim conditions or turning moments of the aircraft about its vertical axis are to be compensated not by the main steering rudder H but by the stabilizing surface D.

The stabilizing surface D is, to this end, adjusted through a worm wheel $g$ secured to the said surface D and a worm $g_1$ by an electric motor E the circuit of which is controlled by a potential divider W which is adjustable in accordance with the relative movement arising between the piston $e_1$ and the cylinder $e$ of the hydraulic flexible device in the control rod of the main steering device. The potential divider W is electrically connected to a contact path $k$ carried by the piston rod of the piston $e_1$ and over which slides a contact arm $k_1$ mounted on the piston rod of the main rudder motor M. It is clear that the adjustment of this contact arm $k_1$ relatively to the contact path $k$ corresponds to the relative movement between the piston $e_1$ and the cylinder $e$, this relative movement again being a measure of the mean deflection of the main steering rudder H. In order to prevent the motor E controlled by the potential divider W from effecting an adjustment of the stabilizing surface D during the whole time in which a part of the return movement to be transmitted from the motor M to the control slide valve S, is stored up in the device $e$, $e_1$ a current interrupter U is located in the circuit of the motor E, and is driven at constant speed by clockwork or the like, and the time during which this interrupter closes the circuit is so determined with respect to the period of interruption, that excessive controlling of the stabilizing surface D by the motor E is prevented.

In a simplified, if less suitable, form of construction the flexible or yielding device $e$, $e_1$, $f$, in the return rod could be entirely dispensed with. The contact path $k$ would then have to be made stationary so that the contact arm $k_1$ would be moved over the contact path by an amount corresponding to the full movement performed by the piston of the motor M.

If desired, the motor E could also be regulated in dependence upon the difference of pressures existing on the two sides of the piston $e_1$ of the damping cylinder $e$, in a similar manner to the control arrangement described with reference to Figure 1.

It will be appreciated that, in the case of the lateral steering control the stabilizing surface D might be arranged in the form of a fixed tail fin and an auxiliary control surface $h$ (as shown in dot and dash lines in Figure 2a) mounted on the main rudder A so as to be adjustable in any known manner with respect to the main rudder H, such adjustment being effected by the motor E.

The construction of the transverse control device for the main ailerons and lateral stabilizing surfaces or auxiliary ailerons as shown at $Q_1$, $Q_2$ and $P_1$, $P_2$ or $q_1$, $q_2$ in Figure 1 can also be contrived in such manner that only the brief oscillations of the aircraft about the longitudinal axis are compensated by the main ailerons $Q_1$, $Q_2$, whilst out-of-trim conditions of the aircraft about the longitudinal axis are compensated by an automatic adjustment of the stabilizing surfaces $P_1$, $P_2$, mounted on the wings or of the auxiliary control flaps $q_1$, $q_2$ on the ailerons; the actual automatic control mechanism for compensating the out-of-trim conditions can be of the same character as those described above in respect of the altitude and lateral steering controls.

It is to be understood that the invention is equally applicable to the control surfaces of water craft; for example to the rudders of ships.

I claim:

1. In an automatic rudder control device for dirigible craft in combination, a main control plane, a servo-motor for adjusting the same, control apparatus, means operable by said apparatus for controlling said servo-motor, an auxiliary control plane, a second servo-motor for adjusting said auxiliary control plane and means operatively connected to said means regulating said main control plane for controlling said second servo-motor in dependence upon the adjusting movement of the main control plane.

2. In an automatic rudder control device for dirigible craft in combination, a main control plane, a servo-motor for adjusting the same, control apparatus, means operable by said apparatus for controlling said servo-motor, an auxiliary control plane, a second servo-motor for adjusting said auxiliary control plane and means operatively connected to said means regulating said main control plane for controlling said second servo-motor in dependence of the adjusting forces arising in the adjusting device of said main control plane.

3. In an automatic rudder control device for airplanes in combination, a main control plane, a servo-motor for adjusting the same, control apparatus, means operable by said apparatus for controlling said servo-motor, a follow-up connection from said servo-motor to said controlling means including a resilient member for partly storing up the follow-up movement, an auxiliary control plane, a second servo-motor for adjusting said auxiliary control plane and means operable by said resilient member for controlling said second servo-motor.

4. In an automatic rudder control device for airplanes in combination, a main control plane, a servo-motor for adjusting the same, control apparatus, means operable by said apparatus for controlling said servo-motor, a follow-up connection from said servo-motor to said controlling means including an hydraulic damping device with a retrieving spring, an auxiliary control plane, a second servo-motor for adjusting said auxiliary control plane and means operable by the resilient member of said hydraulic damping device for controlling said second servo-motor.

5. In an automatic rudder control device for airplanes in combination, a main control plane, a servo-motor for adjusting the same, control apparatus, means operable by said apparatus for controlling said servo-motor, a follow-up connection from said servo-motor to said controlling means including an hydraulic damping device with a retrieving spring, an auxiliary control plane, an electric servo-motor for adjusting said auxiliary control plane, a potentiometer provided in the circuit of said electric servo-motor and adjustable by the resilient member of said hydraulic damping device, and an interruptor device operable periodically to interrupt the circuit of said electric servo-motor.

6. In an automatic rudder control device for aeroplanes in combination, a main control plane, an hydraulic servo-motor for adjusting the same, control apparatus, means operable by said apparatus for controlling said servo-motor, an auxiliary control plane, a second servo-motor for adjusting said auxiliary control plane, a regulating device for said second servo-motor, comprising a differential manometer connected by pipes to the one and the other side of the piston of said hydraulic servo-motor so as to be actuated by the difference of pressures on both sides of said piston.

7. In an automatic rudder control device for aeroplanes in combination, a main control plane, an hydraulic servo-motor for adjusting the same, control apparatus, means operable by said apparatus for controlling said servo-motor, an auxiliary control plane, a second servo-motor for adjusting said auxiliary control plane, a regulating device for said second servo-motor, comprising a differential manometer connected by pipes to the one and the other side of the piston of said hydraulic servo-motor as to be actuated by the difference of pressures on both sides of said piston, and a fluid damping device attached to a diaphragm of said differential manometer.

8. In an automatic rudder control device for dirigible craft in combination, a damping plane, adjustable in response to out-of-trim conditions of the craft, a main control plane adjustably mounted on said damping plane, a first servo-motor for adjusting said main plane, a second servo-motor for adjusting said damping plane, control apparatus, a regulating device for said first servo-motor controlled by said apparatus, a further regulating device for said second servo-motor in operative connection with the first named regulating device.

9. In an automatic rudder control device for dirigible craft, in combination, a main control plane and an auxiliary control plane both for controlling the dirigible craft with regard to the same of its axes, means for operating the main control plane, these means containing a measuring instrument and a servo-motor operable by said measuring instrument, adjusting means for the auxiliary control plane, these adjusting means operable by the means for operating the main control plane.

10. In an automatic rudder control device for dirigible craft, in combination, control planes for controlling the dirigible craft with regard to one of its axes, these control planes being of two kinds, a servo-motor for adjusting a control plane of one kind, a measuring instrument measuring the deviations of the craft about its above-mentioned axis, means operable by said measuring instrument for controlling said servo-motor, a second servo-motor for adjusting a control plane of the other kind, means for controlling the second servo-motor in dependence upon the adjusting movements of a control plane of the first-mentioned kind to compensate out-of-trim conditions of the craft relating to its above-mentioned axis by the adjustment of a control plane of the second-mentioned kind.

EDUARD FISCHEL.